(12) United States Patent
Nomura et al.

(10) Patent No.: US 8,612,153 B2
(45) Date of Patent: Dec. 17, 2013

(54) APPARATUS AND METHOD FOR MAP DATA MANAGEMENT

(75) Inventors: Daisuke Nomura, Chiryu (JP); Mikiya Nakano, Okazaki (JP)

(73) Assignee: Denso Corporation, Kariaya (JP)

( * ) Notice: Subject to any disclaimer, the term of this patent is extended or adjusted under 35 U.S.C. 154(b) by 718 days.

(21) Appl. No.: 12/318,188

(22) Filed: Dec. 23, 2008

(65) Prior Publication Data
US 2009/0192706 A1 Jul. 30, 2009

(30) Foreign Application Priority Data

Jan. 25, 2008 (JP) .................................. 2008-15287
Sep. 12, 2008 (JP) ................................. 2008-235018

(51) Int. Cl.
*G01C 21/00* (2006.01)
(52) U.S. Cl.
USPC ...... 701/540; 701/400; 701/532; 340/995.12; 340/995.18; 717/168; 717/169; 717/170
(58) Field of Classification Search
USPC ............. 701/23–26, 200–203, 207–212, 400, 701/532, 540; 340/988, 990–994, 340/995.1–995.12, 995.14–995.16, 995.18, 340/995.24, 996; 717/168–178
See application file for complete search history.

(56) References Cited

U.S. PATENT DOCUMENTS

| | | | |
|---|---|---|---|
| 6,230,098 B1 | 5/2001 | Ando et al. | |
| 7,395,150 B2 * | 7/2008 | Ohira et al. | 701/450 |
| 7,610,147 B2 * | 10/2009 | Umezu et al. | 701/450 |
| 7,890,255 B2 * | 2/2011 | Ikeuchi et al. | 701/450 |
| 2001/0004724 A1 * | 6/2001 | Nagaki | 701/208 |
| 2004/0002812 A1 | 1/2004 | Yamanaka | |
| 2004/0205266 A1 * | 10/2004 | Regal et al. | 710/29 |
| 2006/0106534 A1 * | 5/2006 | Kawamata et al. | 701/208 |
| 2007/0112862 A1 * | 5/2007 | Iwatsu et al. | 707/200 |
| 2007/0208505 A1 * | 9/2007 | Fujimoto | 701/208 |

(Continued)

FOREIGN PATENT DOCUMENTS

| | | |
|---|---|---|
| JP | A-5-342122 | 12/1993 |
| JP | A-10-190997 | 7/1998 |
| JP | A-2002-199315 | 7/2002 |

OTHER PUBLICATIONS

Office Action issued May 19, 2011 in corresponding CN application No. 200910005923.5 (and English translation).

(Continued)

*Primary Examiner* — Rami Khatib
(74) *Attorney, Agent, or Firm* — Posz Law Group, PLC

(57) ABSTRACT

In a course of updating old map data on a hard disk drive to new map data, a low-priority portion of the old map data that has less importance/necessity is deleted to create a vacant area, and a high-priority portion of the new map data is copied to the vacant area as an update of the map data. Then, the high-priority portion of the old map data is deleted to create another vacant area, and a low-priority portion of the new map data is copied to the vacant area. During the update of the map data, restrictions on the usage of the map data are avoided at all efforts by having the high-priority portion of at least one of the new map data and the old map data maintained on the hard disk drive, while maximizing the utilization of storage resources in a map data management apparatus.

14 Claims, 11 Drawing Sheets

(56) References Cited

U.S. PATENT DOCUMENTS

2007/0244636 A1* 10/2007 Horikami ................. 701/208
2008/0082255 A1*  4/2008 Takahata et al. ........... 701/201
2010/0274472 A1* 10/2010 Sakai et al. ............... 701/200

OTHER PUBLICATIONS

Office Action dated Apr. 20, 2012 in corresponding CN Application No. 200910005923.5 (and English translation).

* cited by examiner

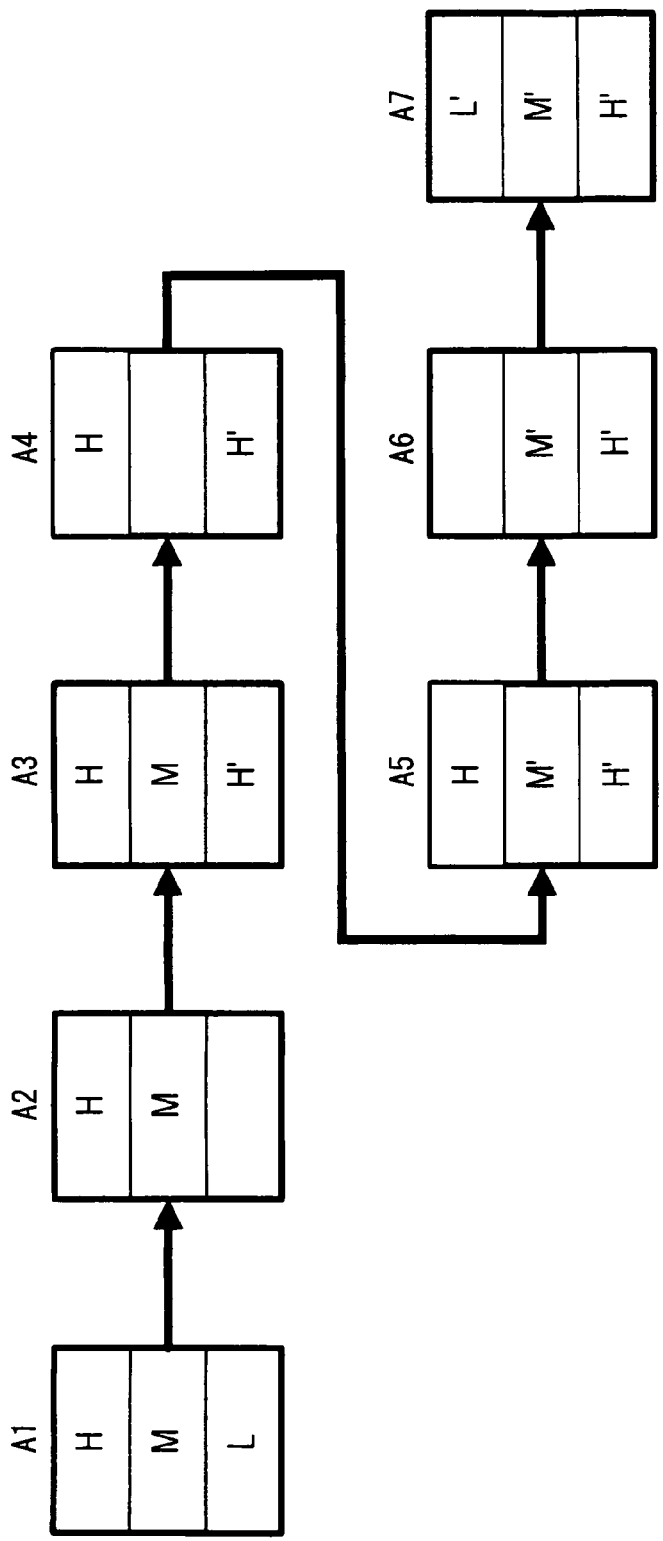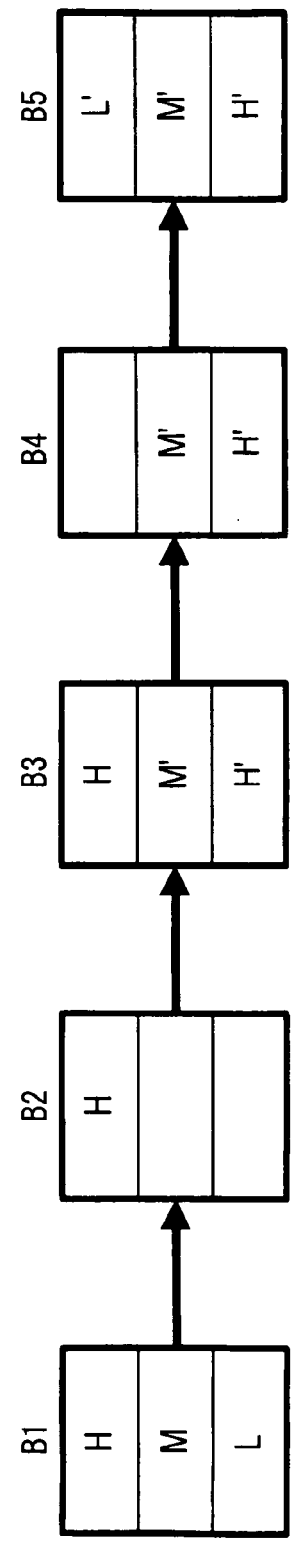
FIG. 6A
FIG. 6B

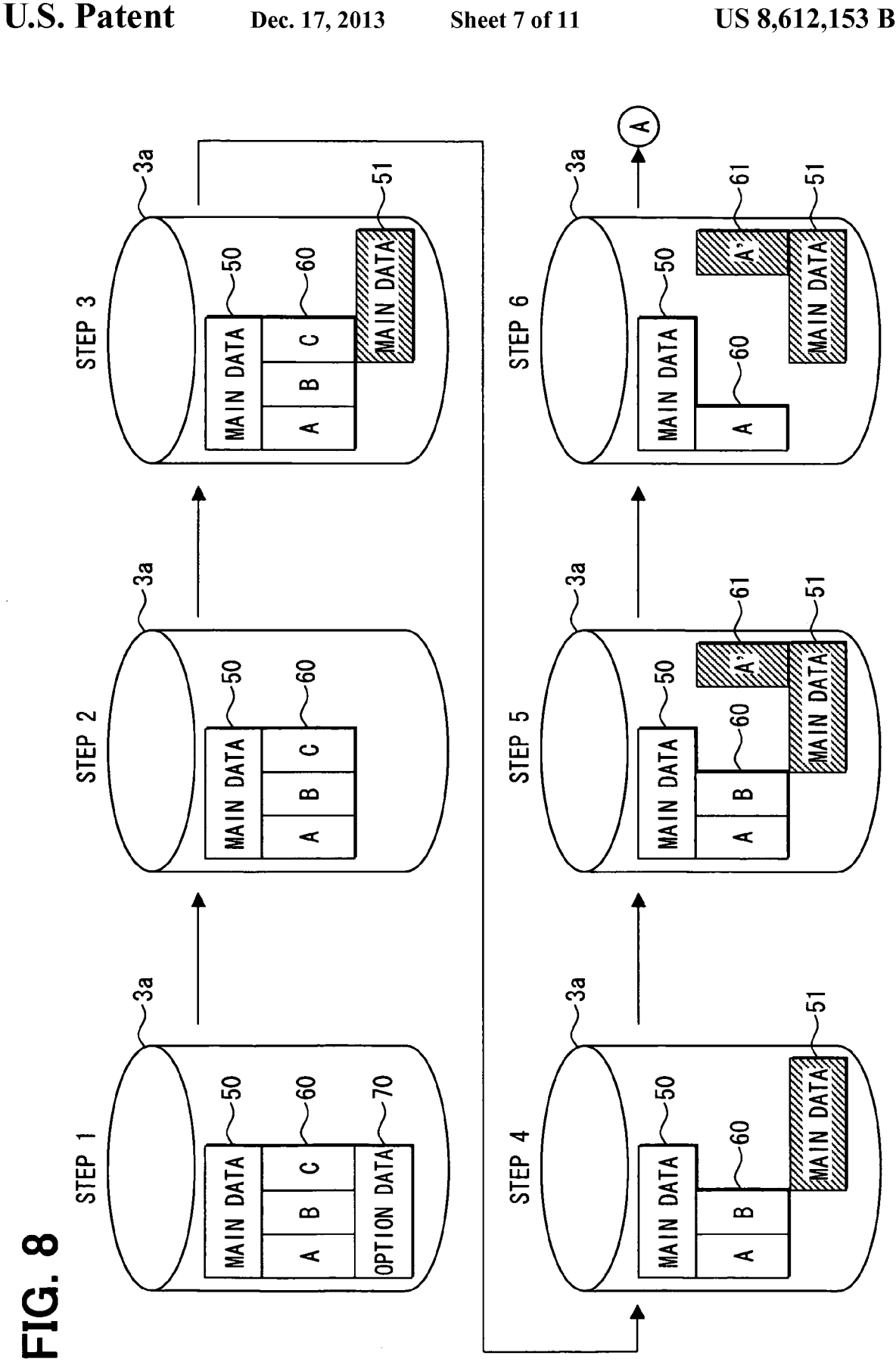

APPARATUS AND METHOD FOR MAP DATA MANAGEMENT

CROSS REFERENCE TO RELATED APPLICATION

The present application is based on and claims the benefit of priority of Japanese Patent Applications No. 2008-15287, filed on Jan. 25, 2008, and No. 2008-235018, filed on Sep. 12, 2008, the disclosure of which are incorporated herein by reference.

FIELD OF THE INVENTION

The present disclosure generally relates to a map data management apparatus and program for controlling the map data management for use in a vehicle.

BACKGROUND INFORMATION

Conventionally, the navigation apparatus used in a vehicle utilizes map data retrieved from a storage unit and a current position of the vehicle derived from GPS unit for displaying the current position on a map on a display unit and for guiding a driver of the vehicle toward a destination together with other assistance.

The navigation apparatus retrieves the map data, by using a reader device such as a CD-ROM drive, a DVD-ROM drive or the like, from a storage medium of CD disks, DVD disks or the like. Alternatively, the map data may be stored in a hard disk drive (HDD).

The map data to be used for route guidance or other function is required to be updated in order to catch up the recent change of the map. The map data may be updated by just replacing the storage medium (e.g., CD-ROM) with the one having the latest data. That is, the map data update is complete when the data storage medium is replaced.

On the other hand, the map data stored on the HDD is required to be replaced with new data. Japanese Patent Document JP-A-H11-95657 discloses the map data update method of that kind.

However, the update of the map data stored on the HDD may take time due to the data volume of the map data or the like. That is, the map data used in the navigation apparatus includes various data types such as road network data for representing connection conditions of the roads, map matching data for the accuracy of positioning, facility data for representing facility information, voice data for providing voice guidance and the like.

Further, during the update of the map data, the operation of the navigation apparatus may be restricted or stopped. For example, if the old map data is completely deleted from a map data storage area for creating vacancy that accommodates the new map data, the map data can not be utilized until the completion of the storage of the new map data.

On the other hand, if the old map data is left in the storage until the completion of the storage of the new map data and the deletion of the old map data take place after the completion of the storage of the new map data, that is, if the old map data and the new map data are made to be co-existing on the same HDD, the map data storage area needs to have a greater capacity for storing both of the new and old map data.

SUMMARY OF THE INVENTION

In view of the above and other problems, the present disclosure provides a map data management apparatus and a program of managing the map data that facilitate an optimum use of restricted storage resources in the apparatus during the update of the map data, with a preventive measure that minimizes a restriction on the usage of the map data during the update of the map data.

In an aspect of the present disclosure, the map data management apparatus includes: a storage for storing map data; a data acquisition unit for acquiring first map data (representing a map); and an update unit for performing update of the data in the storage by replacing second map data in the storage with the first map data acquired by the data acquisition unit. In the above structure, the update unit replaces a low-priority portion of the second map data with a high-priority portion of the first map data as a first replacement, and the update unit replaces a high-priority portion of the second map data with a low-priority portion of the first map data after the first replacement.

The data priority may be interpreted as an importance of the map data, or as a necessity in the phase of map data utilization.

The map data management apparatus as described above may be applied to a navigation apparatus for use in a vehicle. Therefore, the high priority data (e.g., map data) may be interpreted as the important and necessary data for the navigation apparatus, which dictates the basic navigation function of the navigation apparatus. Further, the low priority data (e.g., data used in optional functions) may be interpreted as the less-important and less-necessary data without which the navigation apparatus can be operated.

The process of the update scheme of the map data management apparatus is described in the following, with data names defined as follows. That is, the high priority data in the first map data is named as a high-priority portion of the first data, and the low priority data in the first map data is named as a low-priority portion of the first data. Further, the high priority data in the second map data is named as the high-priority second data, and the low priority portion of the second map data is named as the low-priority second data.

In the above map data management apparatus, the map data stored in the storage (i.e., the second map data) is updated with the map data of desired contents (i.e., the first map data) by, in the first step, replacing the low-priority second data with the high-priority first data. That is, during the data replacement, the high-priority first data and the high-priority second data co-exist in the storage.

If the above map data management apparatus is applied to the navigation apparatus, the navigation apparatus can continue its operation during the data replacement by utilizing the high-priority second data left in the storage, until the completion of the memorization of the high-priority first data in the storage, which succeeds the continuous operation of the navigation apparatus. Therefore, the operation of the navigation apparatus is maintained during the update of the map data, at least in a minimum functionality of displaying a map. In other words, the functionality of the navigation apparatus is maintained due to the preventive measure that prevents the restriction on the utilization of the map data.

Then, the map data management apparatus updates the high-priority second data to the low-priority first data in the storage. Thus, due to the completion of update of the high-priority first data in the storage, the usage of the map data is not restricted. In other words, the map data can be utilized in a continuous manner, with the high-priority second data being not required for the operation of the navigation apparatus at this point. That is, the functionality of the navigation apparatus can be maintained.

The map data management apparatus described above may be implemented as a program product that controls a computer to be providing the above-described functional elements of the apparatus. Therefore, the same advantageous effects are expected when the program product is implemented and executed on the computer.

BRIEF DESCRIPTION OF THE DRAWINGS

Objects, features, and advantages of the present disclosure will become more apparent from the following detailed description made with reference to the accompanying drawings, in which:

FIGS. 6A and 6B are illustrations of a first modification example of the embodiment;

FIG. 8 is a first illustration of the process of map data update processing in the third modification example of the embodiment;

DETAILED DESCRIPTION

Figure 1:
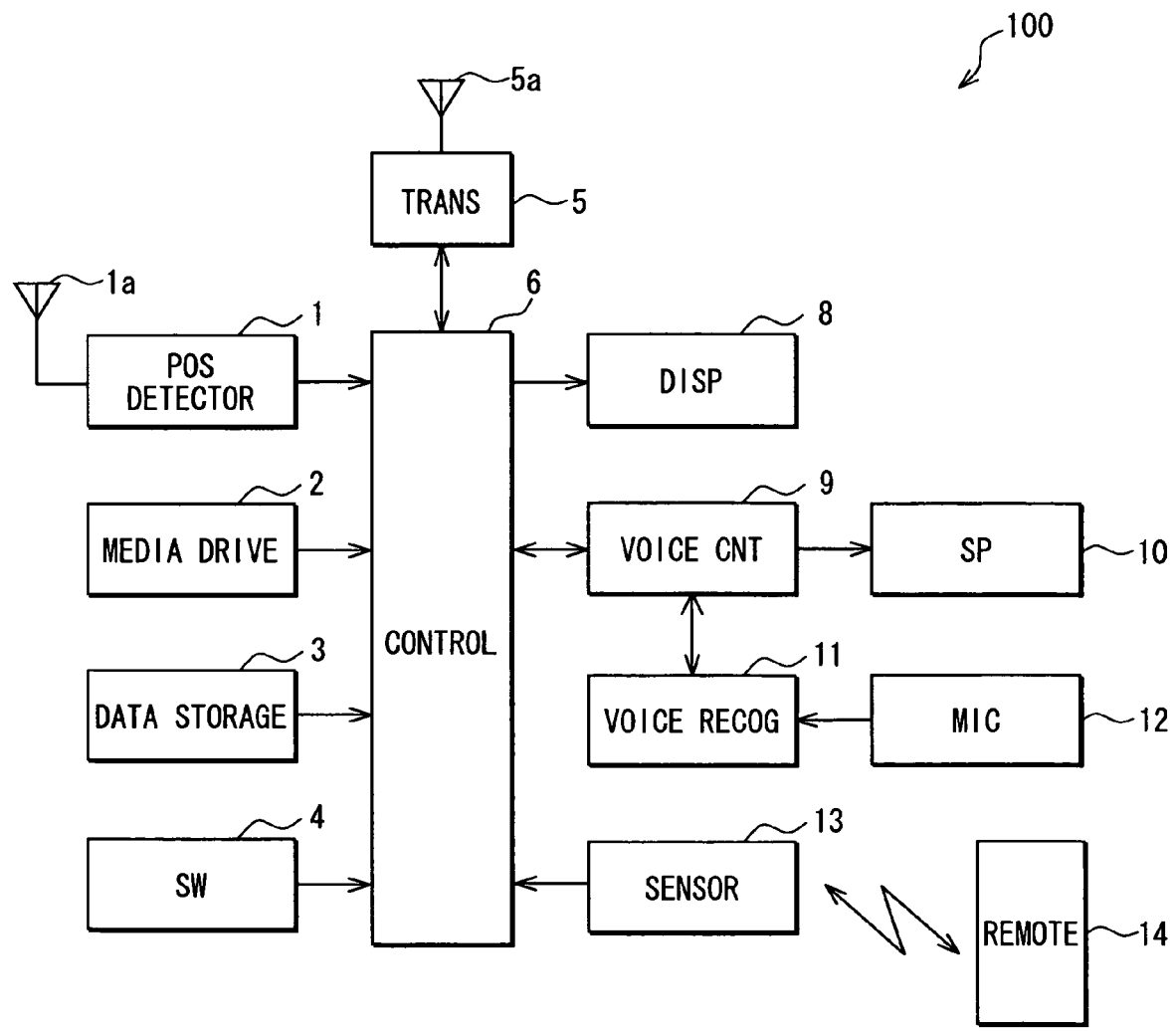
FIG. 1 is a block diagram a block diagram showing an outline configuration of a navigation apparatus in an embodiment of the present invention.

In the following, an embodiment of the present invention is explained based on the drawings. FIG. 1 is a block diagram showing an outline configuration of a navigation apparatus 100 of the present invention.

The navigation apparatus 100 includes a position detector 1 for detecting a current position of a vehicle, a media drive 2 for reading and writing information on a storage medium such as a DVD-ROM/RAM, CD-ROM/RAM and the like, a data storage 3 for storing various kinds of data, an operation switch group 4 for having inputs from a user, a transceiver 5 for having communication with an external device, a display unit 8 for displaying a map and other information, a voice controller 9 for controlling input and output of sound, a speaker 10 for outputting sound in connection to the controller 9, a microphone 12 for collecting sound, a voice recognizer 11 for recognizing voice from the microphone 12, a remote sensor 13 for inputting signals from a remote controller 14, and a control unit 6. In addition, the navigation apparatus 100 is configured to have an electric power from a battery disposed on the vehicle through an ignition switch (the battery and the switch are not illustrated).

The position detector 1 receives the transmission of an electric wave from a GPS satellite through a GPS antenna 1a for detecting a position, a direction, and a speed of the vehicle.

The media drive 2 is a device to read the map data from a media where map data is memorized. Though, the map data is commonly stored on the DVD-ROM/RAM and CD-ROM/RAM, storage media such as memory cards and the like may also be used for the storage of the map data.

The data storage 3 is, for example, a device such as a hard disk drive for memorizing map data. The map data in the hard disk is updated appropriately by the operation of the user. The operation switch group 4 is, for example, a touch panel disposed on a display screen of the display unit 8 and/or a group of mechanical switches integrally disposed on a display screen of the display unit 8 in combination with other type of switches. In addition, there are various touch sensing methods for the touch panel such as a pressure detection method, an electromagnetic induction method, a capacitance method or a combination of those methods, which are all applicable for the touch panel.

The transceiver 5 receives traffic information and map information from a center (for example, VICS center operated in Japan: not illustrated in the figure) through an antenna 5a. The traffic and map information is transmitted to the control unit 6 for calculation of a guidance course or the like.

The display unit 8 is a colored display device, and has a liquid crystal display unit, a plasma display unit, a CRT unit or the like. The display screen of the display unit 8 is capable of displaying a current vehicle position mark for indicating the current position of the vehicle based on the detected current position from the detector 1 and the map data from the media drive 2, a navigation route toward the destination, place names, marks, facility icons and the like in a superposing manner on a map. The screen is also capable of displaying facility guidance as well.

The voice controller 9 is capable of outputting the facility guidance included in the map data as well as various guidance voices through the speaker 10, for example. In addition, the guidance voice that reads the traffic information received through the transceiver 5 may be output through the speaker 10.

In addition, the voice controller 9 has a function to output, to the control unit 6, information represented by the voice that is recognized by the voice recognizer 11. With these functions, the navigation apparatus 100 can be controlled by the voice.

The control unit 6 has a microcomputer having a CPU, a ROM, a RAM, an I/O and a bus line for inter-connection of these components as a central part, and performs various processing such as (1) map display processing for calculating, as a combination of map coordinates and a traveling direction, the current vehicle position based on the detection signal from the position detector 1 and displaying, on the display unit 8, the position on the map that is retrieved from the media or the data storage, and (2) route guidance processing for calculating the destination according to the operation of the operation switch group 4, the remote controller 14 and the like and automatically finding and navigating a route from the current position toward the destination, together with the other processing.

Figure 2:
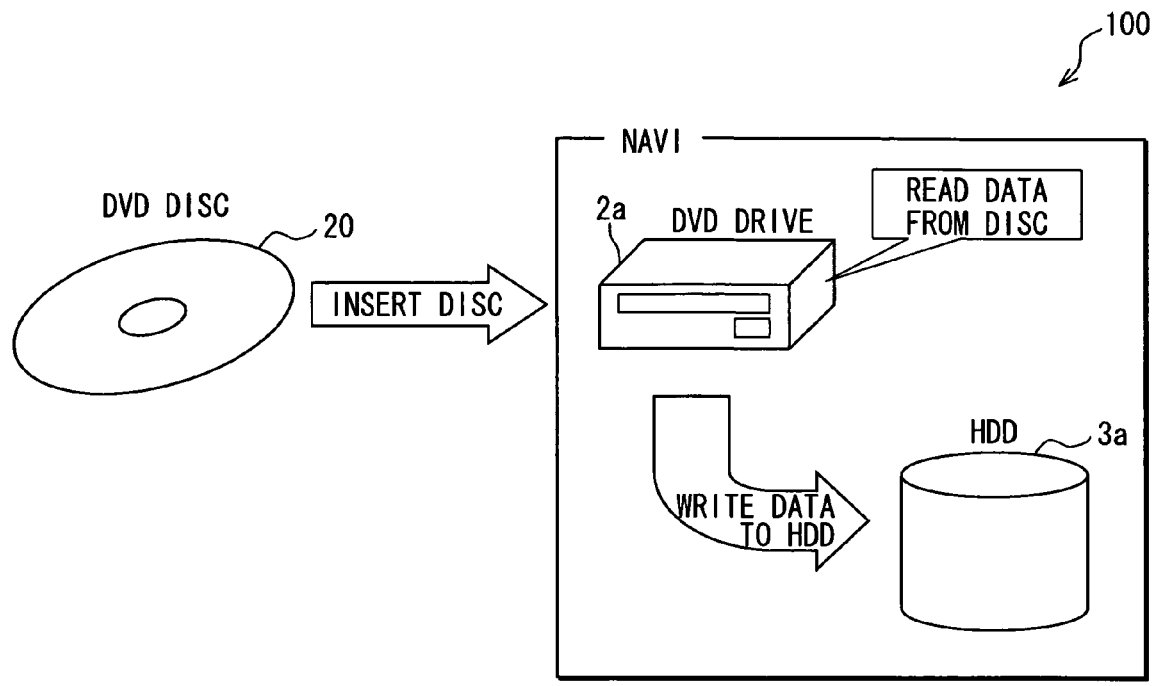
FIG. 2 is an illustration of usage of the navigation apparatus in the embodiment.

FIG. 2 is an illustration of how the navigation apparatus 100 in the present embodiment is used. More practically, the illustration describes the operation of the user for updating the map data. In FIG. 2, a DVD drive 2a corresponds to the media drive 2 in FIG. 1, and an HDD 3a corresponds to the data storage 3 in FIG. 1.

The user inserts a DVD disk 20 (for example, a DVD-ROM) that stores new map data into the DVD drive 2a in the navigation apparatus 100. The DVD drive 2a is the device which can read information memorized on the DVD disk 20.

The new map data read from the DVD disk 20 by the DVD drive 2a is memorized in the HDD 3a as an update that replaces the map data already memorized in the HDD 3a. In the above-described manner, the old map data memorized in the HDD 3a is updated to the new map data.

Details of the map data are explained in the following. The map data is made up from multiple detailed parts of individual data according to data types such as application specific categories or the like. The examples of the individual data are, for example, road data for representing road information, background data for representing building/background information (except for the roads and texts), name data for representing building names, place names, road/intersection names and the like, voice recognition data used for voice recognition, POI type data for representing types of the "Point Of Interest," with other types of data. The individual data described above is stored in the DVD disk 20, or in the HDD 3a with a predetermined name in an electronic file format. In addition, the map data includes various programs for utilizing the individual data.

In the following discussion, an area memorizing the map data is designated as a map data area among the storage areas in the HDD 3a. Further, the map data already stored in the HDD 3a is designated as old map data, which is to be deleted, and the map data stored in the DVD disk 20 is designated as new map data. That is, the map data memorized as an update in the HDD 3a is designated as the new map data. Further, among the old map data, the individual data having a high priority is designated as high priority old data, and the individual data having a low priority is designated as low priority old data. The new map data is, likewise, categorized and designated as either of high priority new data that is the individual data having a high priority or low priority new data that is the individual data having a low priority.

The priority of the individual data is explained in the following. In the present embodiment, the individual data used for displaying the map has the high priority among the map data. For example, the road data for displaying a standard map including a road, a building, place names and the like as well as the background data, the name data, and other data have the higher priority. In addition, the programs for utilizing the above-mentioned individual data have the higher priority. The programs with higher priority are updated at the same timing as the individual data with the higher priority.

On the other hand, the individual data that is not used for displaying the standard map has the low priority. For example, the voice recognition data, the voice guidance data, the POI type data have the lower priority. In addition, the programs for utilizing the above-mentioned low priority data have the lower priority. The programs with the lower priority are updated at the same timing as the individual data with the lower priority.

Figure 3:
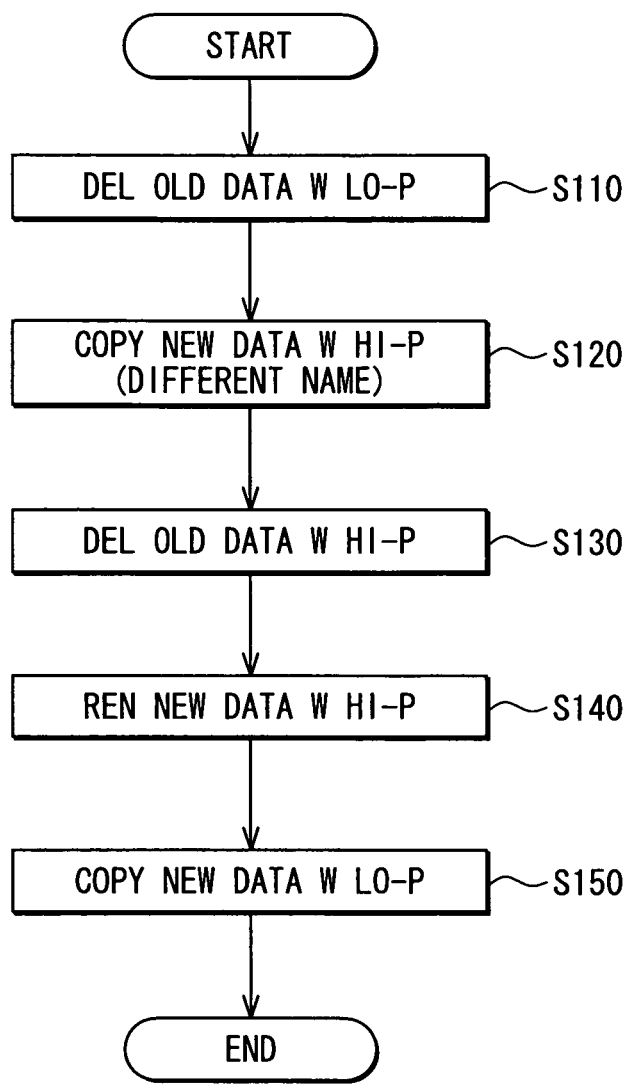
FIG. 3 is a flow chart of map data update processing without interruption.
Figure 4:
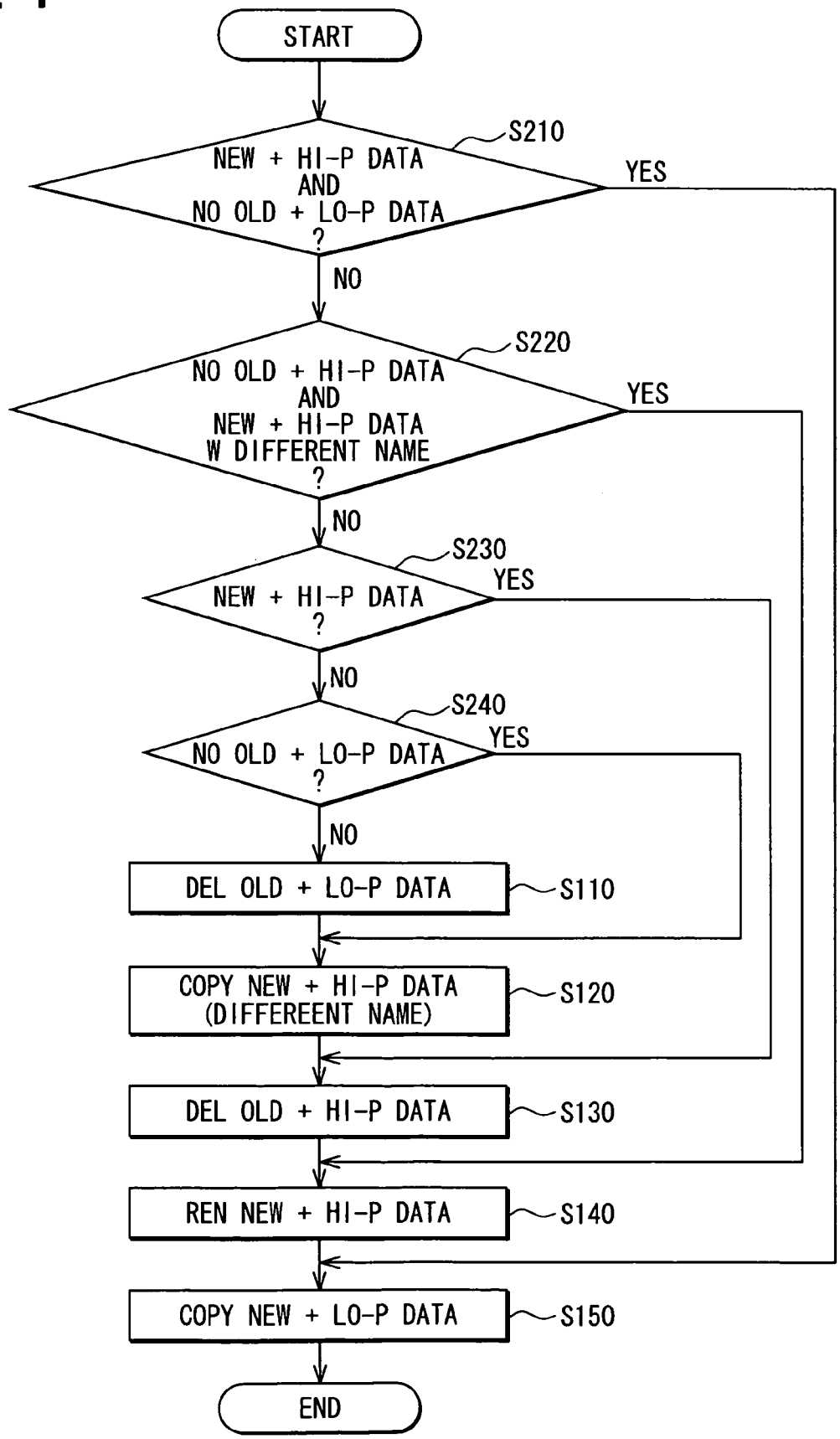
FIG. 4 is a flow chart of the map data update processing with interruption.

FIGS. 3 and 4 are flow charts of map data update processing executed in the control unit 6. That is, the update processing is executed in the CPU of the control unit 6 (not shown in the figure). During the map data update processing, the priorities of data are recognized by the control unit 6 based on the update program or a look-up table that states the priority for each individual data. In addition, though the map data update processing in FIG. 3 is basically carried out, the map data update processing in FIG. 4 is alternatively carried out after, for example, an interruption of the processing in FIG. 3. The control unit 6 is configured to store a flag that represents the completion of the map data update processing. Therefore, by referring to the flag, the completion of the map data update processing, or, in other words, the interruption of the map data update processing can be detected.

The map data update processing of the FIG. 3 is explained first. When the DVD disk 20 is inserted into the DVD drive 2a and a certain operation is performed by the user (e.g., map data update instruction), the map data update processing of the FIG. 3 is started.

At first, in the map data update processing in S110, the individual data with the low priority (i.e., the low priority old data) is deleted from the data area among the old map data currently memorized in the map data area in the HDD 3a.

S120 follows S110 in the processing, and the individual data having the high priority (i.e., the high priority new data) among the new map data stored in the DVD disk 20 in the DVD drive 2a is copied to the map data area in the HDD 3a. That is, the high priority new data is copied to a vacant area that is vacated by the deletion of the low priority old data in S110. In the copy process, the data name of the high priority new data is changed to a different name that can be distinguished from the high priority old data stored in the map data area in the HDD 3a. That is, for example, the character string "new" is appended to the file name of the high priority new data.

Subsequently, the processing proceeds to S130, and, among the old map data memorized in the map data area in the HDD 3a, the individual data with the high priority (i.e., the high priority old data) is deleted from the map data area.

Subsequently, the processing proceeds to S140, and, the file name of the high priority new data in the map data area is returned (i.e., renamed) to the original file name. For example, the added character string "new" is deleted from the file name.

Subsequently, the processing proceeds to S150, and, among the new map data memorized in the map data area in the DVD disk 2a, the individual data with the low priority (i.e., the low priority new data) is copied to the map data area in the HDD 3a. That is, the low priority new data is copied to a vacant area that is vacated by the deletion of the high priority old data in S130. Then, the map data update processing is concluded.

The map data update processing of the FIG. 4 is explained next. In the explanation, like steps have like numbers as used in FIG. 3.

The map data update processing in FIG. 4 is performed when the map data update processing is determined to have been interrupted with reference to the flag by the control unit 6 in the course of starting the control unit 6 (or in the course of starting the navigation apparatus 100).

The series of determinations in S210 to S240 in the map data update processing determine in which step between S110 and S150 in FIG. 3 the update processing has been interrupted. That is, the determination in S210 determines whether the map data area in the HDD 3a has the high priority new data stored therein with no low priority new data. In other words, S210 determines whether S150 is complete or interrupted.

Therefore, if the determination in S210 is affirmative (S210: YES), it is determined that S150 is not complete (i.e., it is interrupted), thereby skipping to S150. The contents of S150 have been described previously.

On the other hand, if the determination in S210 is negative (S210: NO), the process proceeds to S220.

By the determination in S220, it is determined whether the map data area in the HDD 3a has no high priority old data stored therein with the high priority new data having the different file name. That is, the determination in S220 determines whether S130 and S140 in FIG. 3 have been complete or interrupted.

Based on an assumption that the low priority new data and the high priority new data are stored (S210: NO), if the file name of the high priority new data is determined to be different in S220 (S220: YES), it is determined that S140 has not been complete (i.e., has been interrupted), thereby skipping to S140.

The contents of S150 have been described previously.

Based on an assumption that the low priority new data and the high priority new data are stored (S210: NO), if the file name of the high priority new data is not determined to be different in S220 (S220: NO), the process proceeds to S230 by determining that S140 in FIG. 3 is complete.

If the low priority new data and the high priority new data are memorized (S210: NO) or if the high priority new data is not memorized (S210: NO), combined with the negative determination in S220 that the high priority old data is memorized in the map data area in the HDD 3a (S220: NO), it is determined that the process in S130 has not been complete, thereby proceeding to S230.

In S230, it is determined whether the high priority new data is stored in the map data area in the HDD 3a, for the purpose of determining whether S120 in FIG. 3 has been complete, or has been interrupted.

If it is determined, in S230, that the high priority new data is memorized in the map data area in the HDD 3a (S230: YES), it leads to the determination that S120 in FIG. 3 is complete, thereby proceeding to S130. The contents of S130 have been described previously.

If it is determined, in S230, that the high priority new data is not memorized in the map data area in the HDD 3a (S230: NO), it leads to the determination that S120 in FIG. 3 is not complete (i.e., interrupted), thereby proceeding to S240.

In S240, it is determined whether the low priority old data is not memorized, for the purpose of determining S110 has been complete, or has been interrupted. If it is determined in S240 in the affirmative (S240: YES), it is determined that S110 in FIG. 3 is complete, thereby proceeding to S120. The contents of S120 have been described previously.

On the other hand, if it is determined, in S240, in the negative (S240: NO), it is determined that S110 in FIG. 3 is not complete (i.e., interrupted), thereby proceeding to S110. The contents of S110 have been described previously.

FIGS. 5A to 5E are illustrations of the update process of the present embodiment. That is, the illustrations in FIGS. 5A to 5E describe the procedure of the map data update in the map data area in the HDD 3a.

Figure 5A:
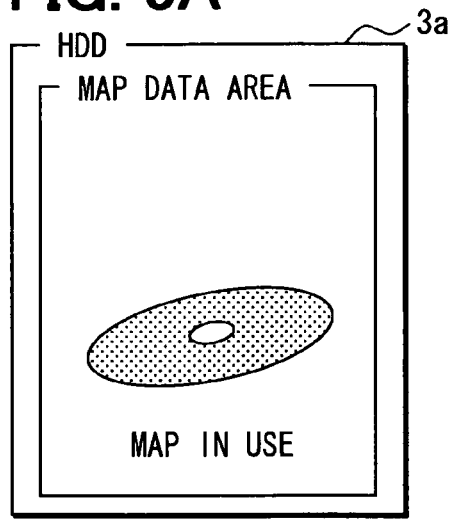
FIGS. 5A to 5E are illustrations of map data update processing in the embodiment.

First, in FIG. 5A, the map data memorized in the map data area is the old map data that is to be the deletion object. In addition, the old map data is used in a predetermined program (a program, for example, to display a map).

Figure 5B:
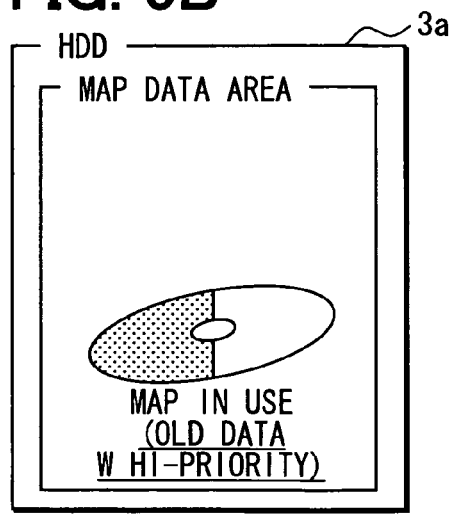

Then, as shown in FIG. 5B in the present embodiment, among the old map data, the individual data that has the high priority (i.e., the high priority old data) is left untouched, and the individual data with the low priority (i.e., the low priority old data) is deleted from the map data area. At this point, though the function that uses the low priority old data (e.g., a function to perform a voice guidance) becomes non-functional, the function that uses the high priority old data (e.g., a function to display a map) can be continuously used in the navigation apparatus 100. In other words, the functionality of the navigation apparatus 100 can be maintained in a reduced manner.

Figure 5C:
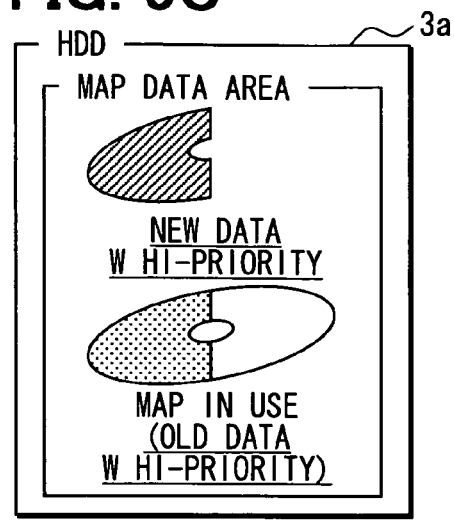

Then, in a vacant area created by the deletion of the low priority old data in the map data area, the individual data having the high priority (i.e., the high priority new data) is stored from among the new map data in the DVD disk 20 as shown in FIG. 5C. In the storage process, the file name is changed to have the string "new" appended thereto for distinguishing the data from the high priority old data.

Figure 5D:
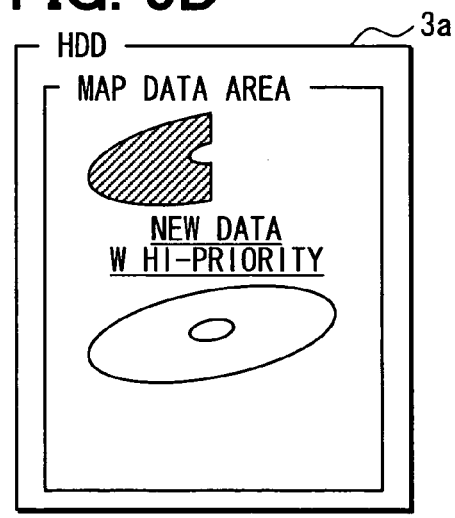

Then, as shown in FIG. 5D, the high priority old data is deleted from the map data area. In this case, the functionality of the navigation apparatus 100 is maintained by using the already-memorized high priority new data in terms of displaying a map or the like in a minimum manner.

Figure 5E:
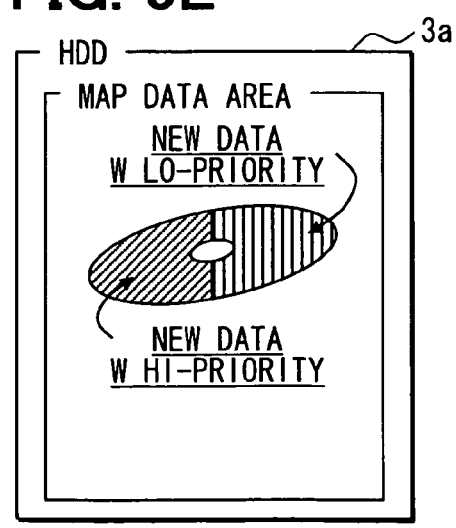

Then, in a vacant area created by the deletion of the high priority old data in the map data area, the individual data having the low priority (i.e., the low priority new data) is stored from among the new map data in the DVD disk 20 as shown in FIG. 5E. The map data in the HDD 3a in the navigation apparatus 100 of the present embodiment is updated according to the above-described procedure. In the present embodiment, the basic function as the navigation apparatus 100 (a function to display a map, for example) can be maintained with the restriction of the functions such as the voice guidance or the like that uses the low priority individual data, because the individual data having the high priority for map display is always stored in the HDD 3a. In other words, the navigation apparatus 100 can be made operational during the update of the map data. In addition, because the map data is updated sequentially, the map data can always be used for displaying a map. That is, for example, during the map data update, the high priority old data is used until the high priority new data becomes available by the update, and, at the point of completion of the update of the high priority new data, the high priority new data is used in place of the high priority old data. Further, after starting the use of the high priority new data, the low priority new data becomes available at the point of completion of the update of the low priority new data.

In addition, in the present embodiment, the data storage 3 (the HDD 3a) corresponds to the storage in terms of correspondence to claim language, and the media drive 2 (the DVD drive 2a) corresponds to a data acquisition unit, and the new map data corresponds to the first map data, and the old map data corresponds to the second map data, and processing described in FIGS. 3 and 4 corresponds to an update unit, respectively.

A first modification of the above embodiment is explained in the following.

In the above embodiment, the priority of the individual data constituting the map data is set as two levels, that is, the level "high" and the level "low." However, the level may be set in multiple ranks. In the first modification of the above embodiment, the priority of the individual data is set as three levels, that is, the level H (H: high), the level M (M: Middle), and the level L (L: Low).

FIGS. 6A and 6B are illustrations of how the map data is updated when the priority of the individual data has three levels. In FIGS. 6A and 6B, the marks H, M, L respectively stand for the high priority individual data, the middle priority individual data, and the low priority individual data among the old map data. Further, the marks H', M', L' respectively stand for the high priority individual data, the middle priority individual data, and the low priority individual data among the new map data. In the following description, the individual data is designated as the data H, data M, data L, data H', data M', and data L'.

In the illustration in FIG. 6A, a first pattern of update, that is, deleting the individual data having the lowest priority is explained. In the illustration in FIG. 6B, a second pattern of update, that is, maintaining the individual data having the highest priority is explained. Marks A1 to A7 in FIG. 6A and, marks B1 to B5 in FIG. 6B respectively stand for the map data areas.

The first update pattern proceeds as follows.

In the first pattern of update, the data L is deleted (See transition from A1 to A2). Then, the vacant area is filled with the data H' as an update (See A3).

Then, the data M is deleted (See A4). Then, the vacant area is with the data M' as an update (See A5).

Then, data H is deleted next (See A6). Then, the vacant area is filled with the data L' as an update (See A7).

As described above, the first pattern of update deletes the individual old data sequentially from the lowest priority level toward the higher priority levels in the old map data, and sequentially memorizes the individual new data from the highest priority level toward the lower priority levels in the new map data.

The second update pattern proceeds as follows.

In the second pattern of update, the data M and data L are deleted (See transition from B1 to B2). The vacant area is filled with the data H' and data M' (See B3).

Then, the data H is deleted (See B4). Then, the vacant area is filled with the data L' (See B5).

In the second pattern of update, the highest priority individual data is left untouched and other data are all deleted at once among the old map data, and the highest priority individual data is deleted at last from the old map data. Correspondingly, as for the new map data, the individual new data other than the one having the lowest priority are memorized first as an update, and the lowest priority individual new data is memorized as an update at last.

Further, in the above embodiment, the priority of the individual data for displaying a map is set to "high" among the map data, and the priority of the individual data not used for displaying a map is set to "low." However, the priority of the individual data may be set according to the data size of the individual data as a second modification of the above embodiment.

For example, the priority of the individual data which is equal to or greater than a predetermined data size is set to "high," and the priority of the individual data which is smaller than the predetermined data size is set to "low." Or, contrarily, the priority of the individual data having a data size which is equal to or greater than a preset value may be set to "low," and the priority of the individual data which is smaller than the predetermined data size may be set to "high."

A third modification of the above embodiment is described in the following. The third modification also uses the multiple priority levels as the first modification of the above embodiment. The following description refers to FIGS. 7 to 9.

Figure 7:
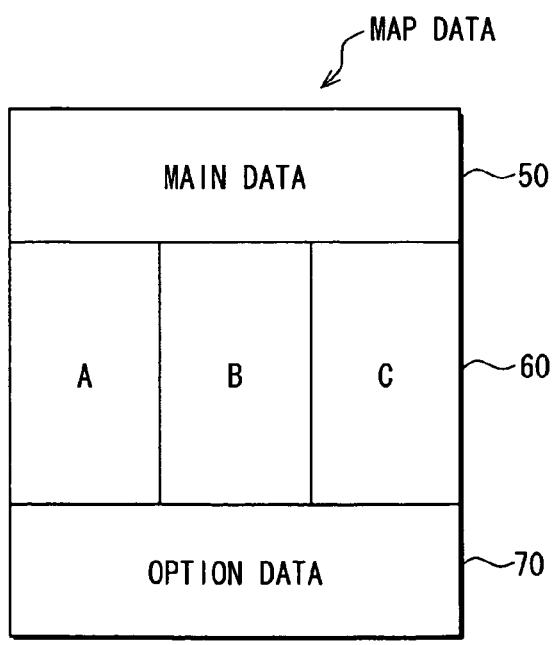
FIG. 7 is an illustration of a structure of map data in a third modification example of the embodiment.

In the third modification, the map data is categorized into three parts, that is, main data 50, area data 60, and option data 70 as an assumption as shown in FIG. 7. In addition, the map data in the present modification is used for performing various navigation functions in a practical sense.

The main data 50 is the data to realize basic navigation functions. For example, main map data for drawing a map (i.e., road data, background data, character data), route calculation data for calculating the route toward the destination, route guidance data for providing guidance for a driver to the destination (various image data, audio data for voice guidance), are included in the main data 50.

The area data 60 consists of data for each of predetermined areas (the area data is designated as individual area data hereinafter). For example, the data to search for a facility (e.g., POI: Point Of Interest) or a location in a certain area, the data to set a destination in the area are included in the individual area data together with other data. In the third modification example, the area data 60 includes three individual area data of A, B, and C.

The option data 70 is the data for performing optional functions among other navigation functions. For example, altitude data for drawing a 3D map, voice recognition data for performing voice recognition, street address data for recognizing street address input by voice are included in the option data 70 among other data.

In the third modification, the priority of the main data 50 is set to the highest level, and the priority of the area data 60 is set to second highest level, and the priority of the option data 70 is set to the lowest in terms of priority order.

In addition, the main data 50 is equivalent to basic data, and the area data 60 is equivalent to guidance-search data, and the option data 70 is equivalent to additional data.

Furthermore, in the area data 60, the priority is determined about the individual map data for each area. For example, the highest priority is assigned to the individual map area that contains the current vehicle position, and the further the individual map area is from the current position, the lower the priority of the data becomes. In other words, the individual map data that represents a closer area to the current position has a higher priority. In addition, in the third modification example, the individual area data A covers the area where the current position of the vehicle is included in, thereby having the highest priority. Further, in the individual area data B and the individual area data C, the former covers a near area of the current position of the vehicle, thereby having the higher priority. The priority of the individual area data C becomes lowest.

Figure 9:
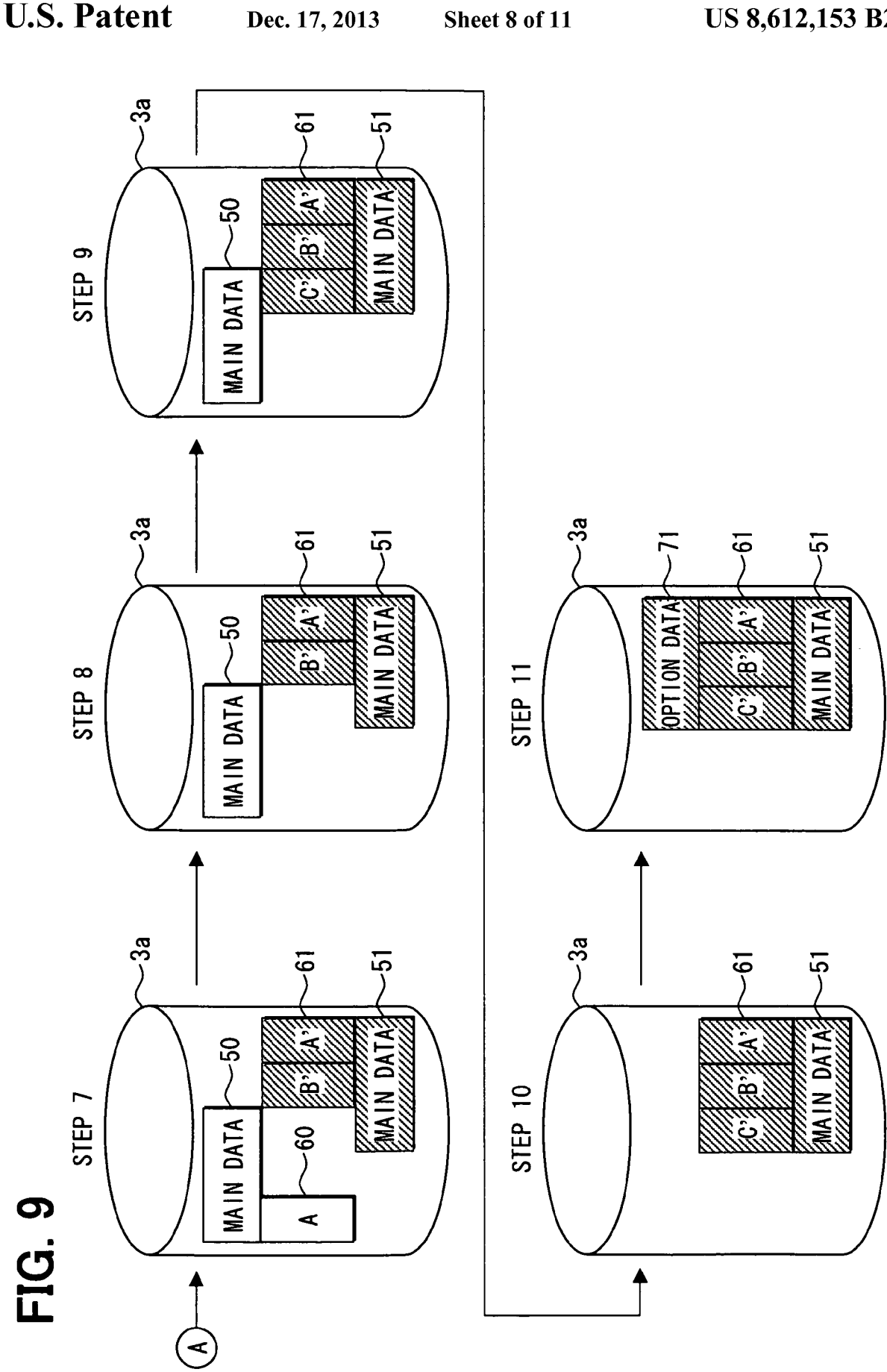
FIG. 9 is a second illustration of the process of map data update processing in the third modification example of the embodiment.

The map data update process in the third modification example is described with reference to FIGS. 8 and 9. The update process shown in FIGS. 8 and 9 is started when the DVD disk 20 (cf. FIG. 2) is inserted into the DVD drive 2a (cf. FIG. 2) by a user with an input of an instruction of a predetermined type, that is, for example, a map data update instruction. In the following description, the term "old" is added to the data before update, and the term "new" is added to the data that serves as an update object.

First, in STEP 1, the old data before the update (the old main data 50, the old area data 60 and the old option data 70) is memorized in the HDD 3a. Then, the old option data 70 is deleted when the update of the map data is started (STEP 2).

Next, the new main data 51 is copied to the HDD 3a (STEP 3). In addition, a string "new" is added to a data name (i.e., a file name) of the new main data 51 before the new main data 51 is copied for the purpose of distinction from the old main data 50. A similar step is taken for the new map data (i.e., the individual map data).

In STEPS 2 and 3, the optional functions among other navigation functions can not be used due to the deletion of the old option data 70 and due to the pre-copy condition of the new option data 70. However, the basic functions based on the old main data 50 for the coverage of the old area data 60 (i.e., the old individual data A, B, C) are available due to the pre-deletion condition of the data 50 and data 60.

Then, from among the old area data 60, the old individual area data C having the lowest priority is deleted (STEP 4). In STEP 4, the basic functions based on the old main data 50 for the coverage of the old individual area data A, B are available due to the pre-deletion condition of the data 50 and data A, B.

Then, from among the new individual area data 61, the new individual area data A' having the highest priority is copied (STEP 5). In STEP 5, the basic functions based on the new main data 51 for the coverage of the new individual area data A' are available due to the post-copy condition of the new main data 51 and the new individual area data A'. In addition to the above-described condition of STEP 5, the basic functions based on the old main data 50 for the coverage of the old individual area data A, B are available due to the pre-deletion condition of the old data 50 and old data A, B.

Then, from among the old area data 60, the old individual area data B having the middle priority is deleted (STEP 6).

Then, the description proceeds for the situation illustrated in FIG. 9. In FIG. 9, from among the new area data 61, the new individual area data B' having the middle priority is copied (STEP 7). In STEP 7, the coverage of the basic functions based on the new main data 51 becomes wider. That is, the basic functions based on the new main data 51 are now available for the coverage of the new individual area data B' in addition to the coverage of the new individual area data A'.

Then, from among the old area data 60, the old individual area data A having the highest priority is deleted (STEP 8). Subsequently, from among the new area data 61, the individual area data C' having the lowest priority is copied (STEP 9). In STEP 9, the coverage of the basic functions based on the new main data 51 becomes wider to a further degree. That is, the basic functions based on the new main data 51 are now available for the coverage of the new individual area data C' in addition to the coverage of the new individual area data A' and B'.

Then, from among the old data, the old main data 50 is deleted (STEP 10).

Subsequently, from among the new data, the new option data 71 is copied (STEP 11). Then, the update of the map data comes to the end. Before ending the process, the string "new" added to the data names (i.e., the file names) of the new main data 51 and the new area data 61 (new individual area data A', B', C') in the course of copying is deleted.

In STEP 11, the basic functions based on the new main data 51 and the optional functions based on the new option data 71 are available for the coverage of the new area data 61 (i.e., the new individual area data A, B, C).

In the third modification example, the map data is categorized into three types, that is, into the main data 50, the area data 60 and the option data 70 as explained above, and the data is updated in a processing order according to the priority levels.

Basically, the old main data 50, the old area data 60, and the old option data 70 are deleted from the HDD 3a in an order from the lowest toward higher in priority, while copying the new main data 51, the new area data 61, and the new option data 71 in the HDD 3a in an order from the highest toward lower in priority. In addition, in the course of the update from the old area data 60 to the new area data 61, the old individual area data A, B, C are deleted from the HDD 3a according to the priority in an ascending priority order (i.e., from the lowest toward highest), and the individual new area data A', B', C' are copied to the HDD 3a in a descending priority order (i.e., from the highest toward lowest). As a result, the update of the old area data 60 to the new area data 61 is complete.

Further, in the third modification example, the user can use at least one of the old main data 50 or the new main data 51 during the update of the map data. Therefore, the basic navigation functions are always available even when the map data update process is in progress.

A fourth modification of the above embodiment is explained with reference to FIGS. 10 and 11.

In the fourth modification example, the data update process is different from the third modification, while the structure of the map data (i.e., the main data 50, the area data 60, and the option data 70) and the priority levels of those data are the same as the third modification.

Figure 10:
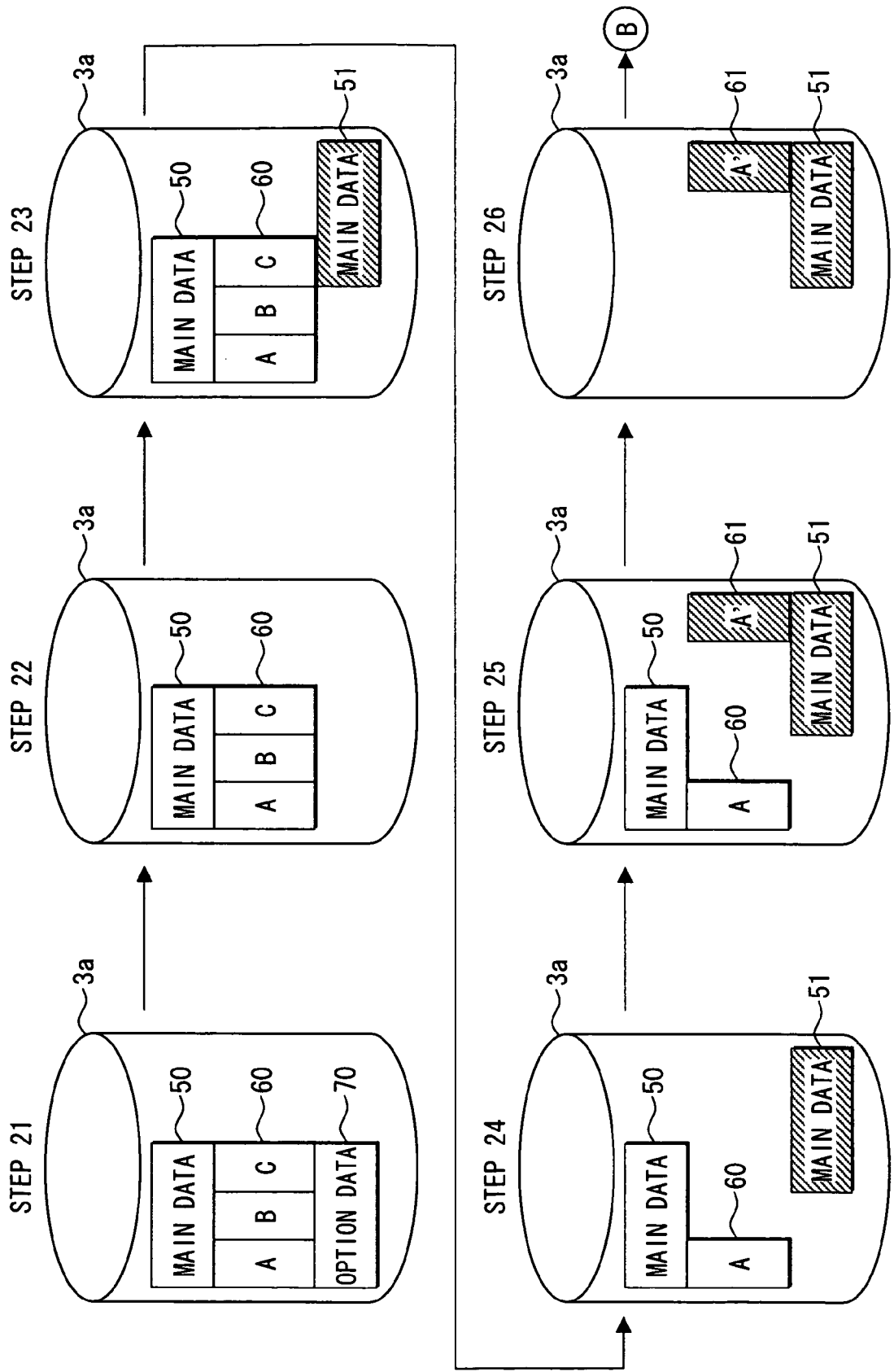
FIG. 10 is a first illustration of the process of map data update processing in the fourth modification example of the embodiment.

First, the old option data 70 is deleted in STEP 22 when the update of the map data is started in STEP 21 where the old data (i.e., the old main data 50, the old area data 60 and the old option data 70) before update is memorized, as shown in FIG. 10.

Then, the new main data 51 is copied as shown in STEP 23. Then, from among the old area data 60, the old individual area data B and C are deleted as shown in STEP 24.

Then, from among the new map data 51, the new individual area data A' is copied as shown in STEP 25. Then, the old main data 50 and the old individual area data A are deleted as shown in STEP 26.

Figure 11:
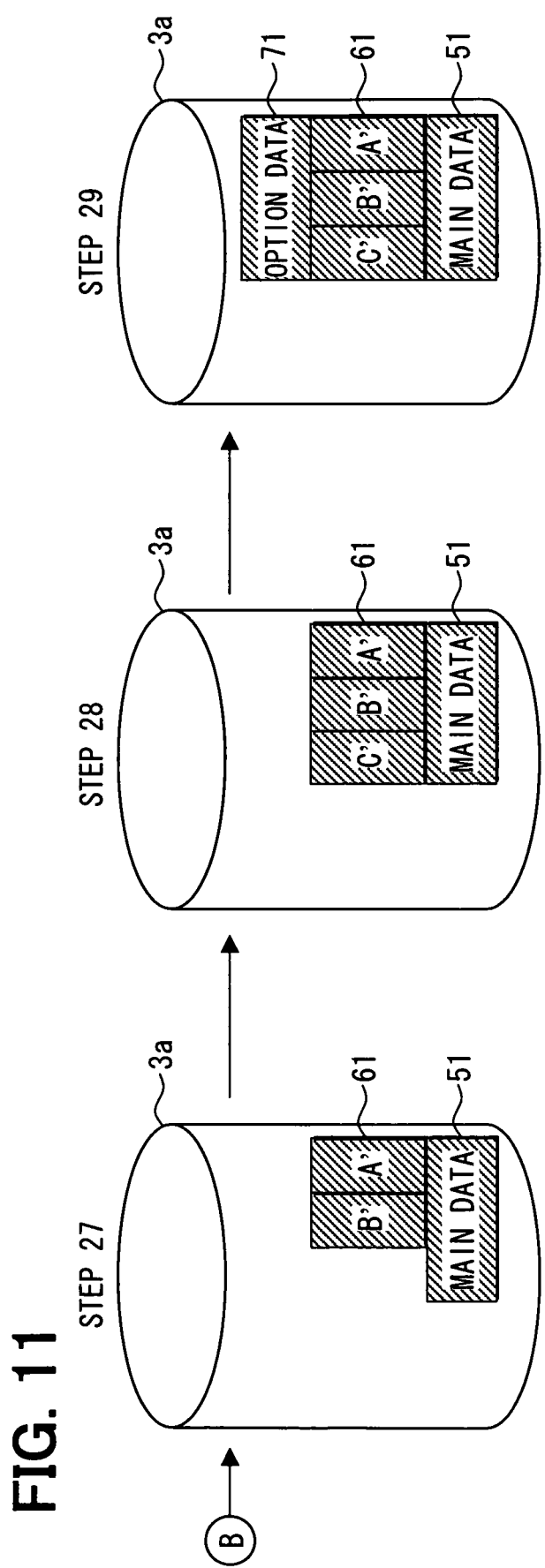
FIG. 11 is a second illustration of the process of map data update processing in the fourth modification example of the embodiment.

Then, the new individual area data B', the new individual area data C', and the new option data 71 are sequentially copied as shown in STEPS 27 to 29 in FIG. 11.

As described above, the old individual area data B and C are deleted collectively in STEP 24, and, the old main data 50 and the old individual area data A are deleted collectively in STEP 26. Therefore, the time required for update of the map data can be decreased.

Further, in case that the optional functions are not required and the area covered by the basic function may be restricted, the update process may be ended in STEP 26. In this manner, the time required for copying the new individual area data B', C' and the new option data 71 can be eliminated, thereby enabling a reduction of the time required for the update of the map data.

Furthermore, in the second to fourth modification examples, it may be possible that the map data update is interrupted for some reason. Therefore, the map data update may be performed in a manner as described in a fifth modification example in the following. The map data update process in the fifth modification of the above embodiment is basically the same as the process described in FIG. 4.

In the fifth modification example, the process is performed in a CPU (not shown) of the control unit 6 (see FIG. 1).

First, information regarding a media (i.e., the DVD disk 20) that stores the new map data is memorized in a predetermined memory at the start of the map data update. That is, for example, the identification information that is unique to the media is memorized.

In addition, during the update of the map data, information representative of to which step the process has been complete (e.g., to which of STEPS 1 to 11 in FIGS. 8 and 9, or STEPS 21 to 29 in FIGS. 10 and 11) is stored in the predetermined memory. The information is designated as interruption information hereinafter.

Figure 12:
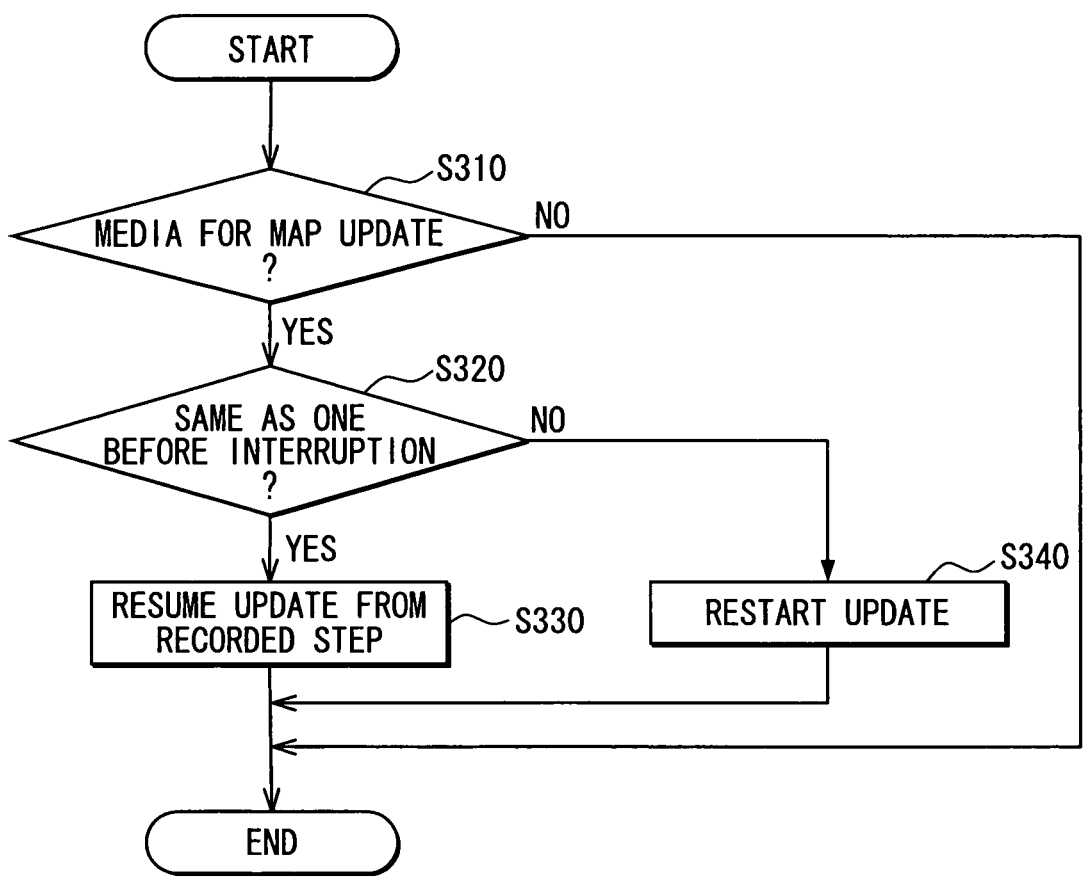
FIG. 12 is a flow chart of the process performed in a CPU of a control unit in a fifth modification example of the embodiment.

Then, the process in FIG. 12 is performed based on the pre-process described above.

The process of FIG. 12 is started, after an interruption of the update of the map data, when the information on the DVD disk 20 inserted in the DVD drive 2a is read.

First, in the process of FIG. 12, it is determined in S310 whether the DVD disk 20 is a medium for the map update. More practically, whether or not the DVD disk 20 is a medium which stores the new map data for the update is determined.

When the DVD disk 20 is determined that it is not the medium for the map update in S310 (S310: NO), the process is then simply finished. On the other hand, when the DVD disk 20 is determined to be the medium for the map update in S310 (S310: YES), the process proceeds to S320.

When the DVD disk 20 is determined in S320 that it is the same medium as the one before the interruption of the update (S320: YES), the process proceeds to S330.

Based on the interruption information memorized in the above-described process, the step where the process has been interrupted is recognized. Then, the process is resumed from the interrupted step. After resuming the interrupted process, the process in FIG. 12 is finished.

On the other hand, the process proceeds to S340 when the DVD disk 20 is determined not to be the same medium as the one before the interruption of the update (S320: NO).

In S340, the update process for updating the map data in the HDD 3a with the map data memorized in the DVD disk 20 is carried out from the beginning. In other words, the update process shown in FIGS. 8 and 9 is performed from STEP 1, or the update process shown in FIGS. 10 and 11 is performed from STEP 21. After performing the update process, the process in FIG. 12 is finished.

The update process can be, according to the fifth modification example, resumed from where the previous map update process is interrupted, thereby enabling an improved efficiency for the interrupted map data update process. In other words, it is not necessary to start the update of the map data again from the beginning, and the increase of time required for the update can be prevented.

Although the present disclosure has been fully described in connection with preferred embodiment thereof with reference to the accompanying drawings, it is to be noted that various changes and modifications will become apparent to those skilled in the art.

For example, in the above embodiments, the new map data to be used as the update object is acquired from the DVD disk 20. However, for example, the new map data may be acquired by wireless communication through the transceiver 5 from an outside of the navigation apparatus 100. In this case, for example, the transceiver 5 is equivalent to the data acquisition unit.

In addition, the update timing of the program for the new map data may be different from the one in the above embodiments if the program for the old map data is capable of handling the new map data. For example, the timing of the program update may be same as the timing of the update of the low priority new data, or may be later than the timing of the update of the low priority new data. Further, the program update timing may also be same as the timing of the update of the high priority new data, or may be before the timing of the update of the high priority new data.

Furthermore, in the first modification example, the data update sequence is out of the question as long as the data H is deleted at the end of the deletion sequence of the old map data and the data H' is updated first in the update sequence of the new map data. For example, in the first patter of update in FIG. 6A, the data L is deleted first. However, the data M may be deleted first.

Furthermore, in the third and fourth modification example, the priority of the individual area data A to C (A' to C') that constitute the area data 60 (61) may be arbitrarily determined. In other words, the update of the individual area data A to C (A' to C') may be performed in any order. For example, from among the individual area data A to C (A' to C'), the data that covers an area closer to the center of the town may have the higher priority. Or, alternatively, from among the individual area data A to C (A' to C'), the data in frequent use may have the higher priority.

Furthermore, in the third and fourth modification example, the priority of the individual area data A to C (A' to C') may be determined according to user's preference. Furthermore, the user may also be determine the priority of the main data 50 (51), the area data 60 (61) and the option data 70 (71). Furthermore, the priority of the individual data may also be determined by the user in the other embodiments of the third and fourth modification example.

The priority determination scheme and data update scheme used throughout the embodiments of the present invention may be described in the following manner. That is:

(1) The priority may be defined as a pre-fixed constant value that remains unchanged throughout the operation, or may be defined as a variable value that can be changed by the apparatus, the process, or the like.

(2) The variable priority value defined by, for example, the navigation apparatus may be configured to be determined:
 (2-a) automatically according to a condition of the navigation apparatus such as a current position of the navigation apparatus or the like, or
 (2-b) manually and/or arbitrarily according to the user's preference based on, for example, an input from a priority setting unit of the navigation apparatus.

(3) The sequential order of the update process of the data/program may be determined according to the priority associated with each element of the data/program by, for example, using a priority recognition unit of the navigation apparatus that detects the data/program priority associated therewith.

Such changes, modifications, and summarized scheme are to be understood as being within the scope of the present disclosure as defined by appended claims.

What is claimed is:

1. A map data management apparatus comprising:
a storage for storing map data;
a data acquisition unit for acquiring data as first map data that is to be used in the apparatus; and
an update unit for performing update of the data in the storage by replacing a second map data in the storage with the first map data acquired by the data acquisition unit, wherein
the first map data includes at least a high-priority portion and a low-priority portion,
the second map data includes at least a high-priority portion and a low-priority portion,
the update unit replaces the low-priority portion of the second map data with the high-priority portion of the first map data as a first replacement, replacement of the low-priority portions of the second map data with the high-priority portion of the first map data being performed by storing the high priority portion of the first map data for the update in the storage, thereby allowing co-existence of the high-priority portion of the first map data and the high-priority portion of the second map data in the storage, and
the update unit thereafter replaces the high-priority portion of the second map data with the low-priority portion of the first map data after the first replacement.

2. The map data management apparatus of claim 1, wherein
the data priority has multiple priority levels from a lowest priority data portion to a highest priority data portion,
the update unit replaces one of sub-highest priority data portions in the second map data with a highest priority data portion from the first map data,
the update unit subsequently replaces the other sub-highest priority data portions in the second map data with the data portions from the first map data in an order of descending priority levels, and
the update unit finally replaces a highest priority data portion in the second map data with a lowest priority data portion from the first map data.

3. The map data management apparatus of claim 2, wherein
the map data management apparatus is disposed in a vehicle,
the map data is used for route guidance of a navigation system for use in the vehicle, the map data includes a basic data used for a basic route guidance function, an area data used for search function, and an additional data used for optional functions, the basic data has a highest data priority level, the area data has a second highest data priority level, and the additional data has a lowest data priority.

4. The map data management apparatus of claim 1, wherein a portion of the first and second map data for displaying map on an information display device has a higher priority than other portion of the data.

5. The map data management apparatus of claim 1, wherein the data priority of each data element in the first and second map data is determined according to a data size of the each data element.

6. The map data management apparatus of claim 1 further comprising:

a priority recognition unit for identifying a data priority of a data element, wherein the update unit performs the update of the data based on the identified data priority of the data element.

7. The map data management apparatus of claim 1 further comprising:

a priority setting unit for setting a data priority of a data element.

8. The map data management apparatus of claim 1, wherein a first status that indicates that the first replacement of the update unit replacement is complete is stored in a predetermined memory, wherein a second status that indicates that the update unit completed the replacement of the high priority portion of the second map data with the low-priority portion of the first map data is stored in the predetermined memory and replaces the first status, and wherein when the update of the data in the storage is interrupted, the update unit resumes the update process based on whether the stored information is one of the first status and the second status.

9. The map data management apparatus of claim 1, wherein the high-priority portion of the first map data and the second map data is data used for displaying a map, and the low-priority portion of the first map data and the second map data is data not used for displaying the map.

10. The map data management apparatus of claim 1, wherein the high-priority portion of the first map data and the second map data is geographical data, and the low-priority portion of the first map data and the second map data is non-geographical data.

11. The map data management apparatus of claim 1, wherein in the first map data and the second map data, a first portion of the map data representing a first area that is close to a current object position is designated as the high-priority portion, and a second portion of the map data representing a second area other than the first area is designated as the low priority data.

12. The map data management apparatus of claim 11, wherein the current object position is a current vehicle position.

13. A map data management apparatus comprising:

a storage for storing map data;

a data acquisition unit for acquiring data as first map data that is to be used in the apparatus; and an update unit for performing update of the data in the storage by replacing a second map data in the storage with the first map data acquired by the data acquisition unit, wherein a data element in the first map data and the second map data has a higher data priority in proportion to closeness of a geographical area represented by the data element to a current vehicle position, the update unit replaces a low-priority portion of the second map data with a high-priority portion of the first map data as a first replacement, and the update unit replaces a high-priority portion of the second map data with a low-priority portion of the first map data after the first replacement.

14. A method for updating map data in a map data management apparatus that has a storage for storing map data, a data acquisition unit for acquiring map data, and a controller, the method comprising:

performing, by the controller, a map data update that replaces older, second map data stored in the storage with newer, first map data acquired by the data acquisition unit, wherein a low-priority portion of the second map data is replaced, by the controller, with a high-priority portion of the first map data as a first replacement, and a high-priority portion of the second map data is replaced, by the controller, with a low-priority portion of the first map data after the first replacement.

* * * * *